United States Patent [19]

Suzuki

[11] 4,312,389
[45] Jan. 26, 1982

[54] VALVE MECHANISM OF ROLLING SEAL TYPE AND GAS LIGHTER VALVES USING THE SAME

[76] Inventor: Eiji Suzuki, 681-5 Oiso, Oiso-machi, Naka-gun, Kanagawa, Japan

[21] Appl. No.: 111,667

[22] Filed: Jan. 14, 1980

[51] Int. Cl.$^3$ .................................................. B65B 3/04
[52] U.S. Cl. .................................... 141/291; 141/302; 251/353; 251/354
[58] Field of Search ............... 251/321, 353, 354, 340; 277/155, 165, 168; 141/285–302, 346–362; 222/518, 544

[56] References Cited

U.S. PATENT DOCUMENTS 2,686,652  8/1954  Carlson et al. ...................... 251/353
3,283,963  11/1966  Boyer et al. ......................... 251/353

*Primary Examiner*—Houston S. Bell, Jr.
*Attorney, Agent, or Firm*—Cantor and Singer

[57] ABSTRACT

A novel valve mechanism using the so-called "rolling seal" type flexible cover tube. This cover tube is fitted fluid-tight on the outer circumference of a generally cylindrical inner movable valve member which is formed with an axial bore providing a fluid passage and which is further formed at its outer circumference with a valve port having communication with the axial bore. The cover tube has its at least one end radially turned or rolled radially outwardly to provide a turned annular lip where it is fitted on a fastened outer cylinder. Thus, the valve port is opened and closed by the outward and inward rolling motions of the annular lip of the cover tube due to the relative movements in the axial direction between the outer cylinder and the inner valve member. By the use of the valve mechanism thus constructed, a charging valve for a gas lighter can be provided. Moreover, a gas lighter injecting and charging valve of direct connection type can also be provided, in which a gas supply bomb can be connected directly to the gas lighter during the charging operation without removing the nozzle exit from the lighter.

17 Claims, 4 Drawing Figures

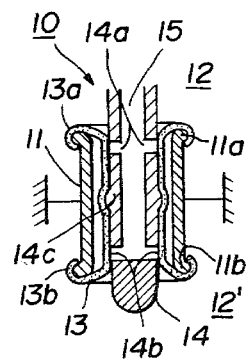
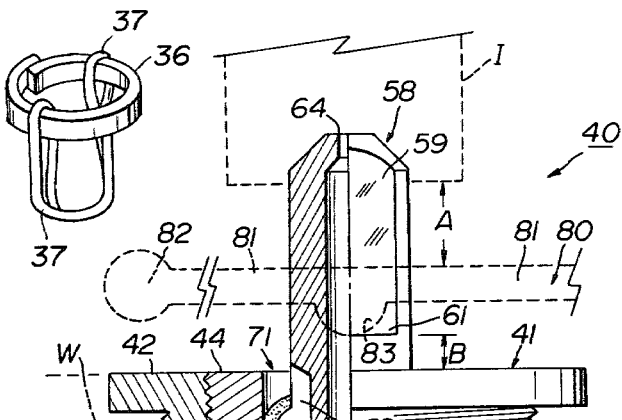
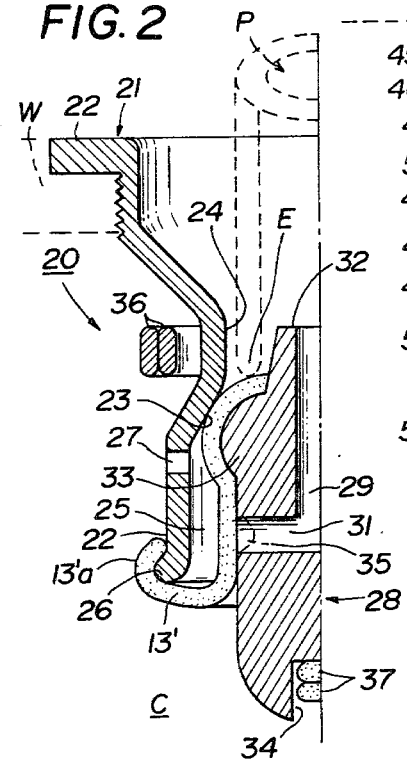
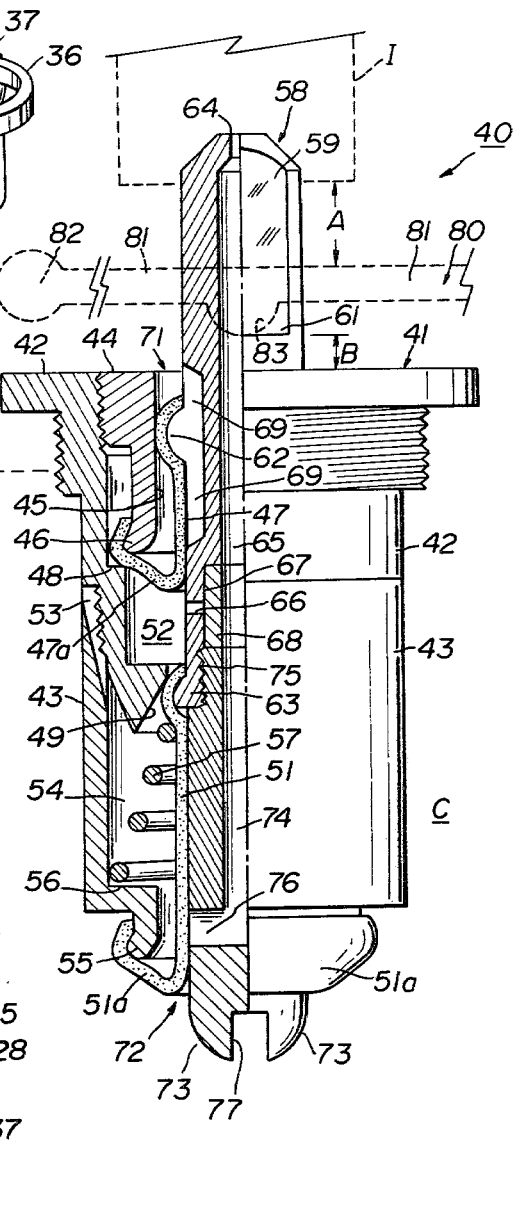

VALVE MECHANISM OF ROLLING SEAL TYPE AND GAS LIGHTER VALVES USING THE SAME

BACKGROUND OF THE INVENTION

1. Field of the Invention

The present invention relates to a novel valve mechanism using the so-called "rolling seal" type flexible cover tube, and more particularly to a valve mechanism of the above type, in which a flexible cover tube is fitted fluid-tight on the outer circumference of an inner movable valve member having a cylindrical shape, an axial bore for a fluid passage, and a valve port having communication with the axial bore. The flexible cover tube has at least one end radially turned or rolled radially outwardly to provide a turned annular lip where it is fitted on an outer cylinder, whereby the valve port is opened and closed by the outward and inward rolling motions of the annular lip of the cover tube due to the relative movements in the axial direction between the outer cylinder and the inner valve member. The present invention further relates to a gas lighter charging valve using the valve mechanism of the above type and to a gas lighter injecting and charging valve of the direct connection type, in which a gas supply bomb can be connected directly to the gas lighter during the charging operation without removing the nozzle exit of the lighter, while also using the aforementioned valve mechanism.

2. Description of the Prior Art

There have been proposed and known in the art a variety of valve mechanisms, in which the modes of the relative movements between a valve member and a valve seat are almost accomplished by the sliding engagement or the press-fit. As a result, the known valve mechanisms cannot be free from deterioration in their functions such as the fluid leakage due to the wear, especially, of eccentric property between the valve member and its seat. It is therefore necessary to have at least those two parts highly precision-machined and to take special consideration in their materials. As a result, the prior art has several disadvantages including that the costs for both production and maintenance are increased and that the construction according to the prior art is not suitable for mass-production.

SUMMARY OF THE INVENTION

The present invention therefore contemplates to eliminate the foregoing disadvantage and to provide a valve mechanism which can succeed in attaining the contemplation by resorting to a novel member or a flexible cover tube of the rolling seal type.

The present invention further contemplates to provide a gas lighter charging valve and a gas lighter injecting and charging valve of the direct connection type, both using the above valve mechanism.

According to a primary feature of the present invention, there is provided a valve member comprising: an inner movable valve member having a cylindrical shape and formed in its outer circumference with at least one valve port and in its inside with at least one fluid passage having communication with said valve port; a fastened outer cylinder formed on at least one end thereof with a cylinder portion fitted coaxially and loosely fitted on the outer circumference of said inner movable valve member; and an elastic flexible cover tube having a smaller thickness than the loosely fitting spacing between said inner movable valve member and said outer cylinder and having its portion fitted fluid-tight on said inner movable valve member, said flexible cover tube having its middle portion flexibly turned off in a coaxial manner to provide a turned annular lip, where it is fitted on the portion of said outer cylinder, whereby the turned annular lip of said flexible cover tube is rolled along the outer circumference of said valve member, while sealing the same, thereby to open and close the valve port of said valve member.

According to a secondary feature of the present invention, there is provided a gas lighter charging valve for charging liquidified gases when the valved charging pipe of a gas supply bomb is forced thereinto, comprising: a fastened outer cylinder mounted to depend into the chamber of the tank of a gas lighter from the head wall of the tank; an inner movable valve member having a generally cylindrical shape fitted coaxially in said outer cylinder in a manner to move up and down and formed at its outer circumference with a valve port and at its inside with a charging passage extending from the center of the upper side thereof to said valve port; and an elastic flexible cover tube depending along the outer circumference of said valve member, while being fitted fluid-tight on said outer circumference, in a manner to cover and seal the valve port of said valve member during the time other than the charging operation, said cover tube having its lower portion coaxially turned upward to the outside to provide a turned annular lip, where it is fitted at its outer upper end on the lower end of said outer cylinder, said cover tube being made to have such an elasticity as can mainly perform the upward biasing operation of said valve member.

According to a tertiary feature of the present invention, there is provided an injecting and charging valve of direct connection type for a gas lighter, comprising: a fastened outer cylinder including at least upper and lower cylinder portions mounted removably to each other and formed in between with a discharge passage having communication with the chamber of the tank of said gas lighter; a cylindrical nozzle member having its substantially lower half received in said outer cylinder, while being additionally biased by the action of bias means, and its substantially upper half protruding upward from said outer cylinder and formed with an injection shoulder to be brought into contact with an actuating mechanism for effecting and adjusting the injection; an elastic tubular member coaxially fitted in the lower expanded wall of the axial through bore, which is expanded from the nozzle exit at the head of said nozzle member and made to coaxially extend downward therefrom in a communicating manner, thereby to provide a check valve mechanism for automatically interchanging the injecting and charging operations an inner movable valve member of cylindrical shape loosely bearing the lower edge of said tubular member and connected to said nozzle member coaxially in a sealing manner; and a pair of elastic flexible cover tubes having their respective inner and outer end sides fitted, respectively, between said outer cylinder and the upper and lower outer circumferences above and below the injection side wall, which is formed in the lower wall of said nozzle member while extending in the direction toward said check valve mechanism, thereby to provide a discharging stroke valve mechanism and an injecting, discharging and charging valve mechanism, respectively, whereby the injection from said nozzle exit is effected and adjusted in accordance with the beginning depression stroke in which said nozzle member is depressed through the injection shoulder thereof by the action of said actuating mechanism, and wherein the charging operation is effected simultaneously with the discharging operation by the depression of the valved charging injection port of said gas supply bomb, which is connected directly to said nozzle exit in a fluid-tight communicating manner during the charging operation, until the ending depression stroke exceeding said beginning depression stroke but included in the full stroke composed of the beginning and ending depression strokes.

BRIEF DESCRIPTION OF THE DRAWING

Other objects and advantage of the present invention will become apparent from the following description made with reference to the accompanying drawing, in which:

FIG. 1 is a longitudinal section taken on the axis of a valve mechanism, in which the present invention is applied to a change-over valve;

FIG. 2 is an enlarged longitudinal section showing the lefthand side of a gas lighter charging valve and taken on the axis thereof with the righthand side being omitted because of general symmetry;

FIG. 3 is a perspective view showing additional bias means which is taken out of the charging valve of FIG. 2; and FIG. 4 is an enlarged front elevation of a gas lighter injecting and charging valve of direct connection type with the lefthand side being shown in section taken on the axis.

DESCRIPTION OF THE PREFERRED EMBODIMENTS

With reference to FIG. 1, there is shown diagrammatically in a longitudinal section a first embodiment of the present invention, in which a single elastic flexible cover tube has two oppositely turned annular lips at each end so that it may be used as a change-over valve. Although the present invention can naturally be applied to such a construction as has a plurality of cover tubes or only one turned annular lip and to other usages, as will be exemplified in the following description with reference to other Figures, it should be understood that the present invention is not limited to any of those applications.

A novel valve mechanism according to the present invention, as indicated generally at 10, includes a fastened outer cylinder 11, the outside of which is divided into two outer spaces 12 and 12'. There is mounted on both ends of the outer cylinder 11 an elastic flexible cover tube 13 which has both ends oppositely turned radially outwardly to form annular lips 13a and 13b. The outer cylinder 11 is made to have both ends protruding radially outwardly to form a bead, as shown at numerals 11a and 11b, over which is fitted the annular lips 13a and 13b of the flexible cover tube 13. There is disposed within the outer cylinder 11 an inner movable cylindrical valve member 14 having an axial bore 15 which is closed at one end. The valve member 14 is formed with a pair of valve ports 14a and 14b which are made to extend through the wall of valve member 14 from the axial bore 15 to the outer spaces 12 and 12' while being axially spaced from each other. The valve member 14 further has an annular protrusion 14c axially centered on the outer circumference thereof. The flexible cover tube 13 is snugly fastened on protrusion 14c.

The flexible cover tube 13 is hermetically fitted, as shown, on the outer circumference of the inner movable valve member 14 thereby to cover and seal the two valve ports 14a and 14b. Although the fitting engagement in between can substantially prevent axial slippage even as it is, it is ensured by the provision of the annular protrusion 14c of the valve member 14. Thus, by the relative movement of the valve member 14 to the outer cylinder 11 in the axial direction, the annular lips 13a and 13b of the valve member 13 are rolled back and forth to open either the valve ports 14a or the valve ports 14b in accordance with the direction of the axial movement, i.e., to establish communication between the axial bore 15 and the outer space 12 or 12', thereby effecting the action of the change-over valve.

Incidentally, the flexible cover tube 13 may be made of such a material as has an elastic flexible property and a fluid-tight property, for instance, synthetic rubber and is formed into a tubular shape having a generally uniform thickness. In an alternative, however, the cover tube 13 may be either a tube having a uniform diameter or such a tube having a varying diameter or taper shape, although not shown, as has at least one portion close to one end thereof, i.e., the portion where it is fitted on the outer cylinder 11, expanded suddenly or gradually.

Although not shown, moreover, it is quite natural that the valve mechanism 10 can be equipped at its inside or outside with such suitable bias means for biasing the movable valve member 14 either into the valve-closed condition shown in FIG. 1 or to the valve-opened condition of either side.

The advantages of the valve mechanism 10 are itemized in the following:

(1) Since the member (i.e., the flexible cover tube 13 in the embodiment thus far described) made coactive with the valve ports to perform a valve action is not slid but rolled back and forth so that it is brought into and out of engagement with the valve ports, the valve mechanism 10 is free from any wear and fluid leakage which is often experienced in the prior art valve mechanisms due to the sliding engagement or press-fit.

(2) As is easily understood from the construction thus far described, the machining precision required of the parts of the valve mechanism 10 is not strict, nor is the rigidity required of the parts other than the cover tube as high as that of metal.

(3) Any suitable machining method for mass-production such as the press work for metal pipes or plastics can be applied to the machining process of the valve mechanism 10.

(4) In case a tube having a uniform diameter is adopted as the cover tube, it is sufficient to merely cut a long tube to a desired length.

Reference is now turned to FIG. 2 showing the lefthand side of an enlarged longitudinal section of a gas lighter charging valve, as indicated generally at 20, to which the valve mechanism 10 according to the first embodiment of the present invention is applied. A fastened outer cylinder 21 is mounted to depend from the head wall W of a tank, which is shown in broken lines, to a tank chamber C. The outer cylinder 21 thus mounted is made to have its cylinder portion 22 formed with a conical valve seat 23 which coaxially joins the axial through hole 24 of the cylinder portion 22 and the expanded lower portion defining a cylindrical recess 25, an annular protrusion 26 which is located at the lowermost end thereof while protruding radially outwardly, and a discharge hole 27 which is located just below the valve seat 23 while extending through the side wall thereof. Incidentally, letters P and E indicate the valved charging pipe of a not-shown supply gas bomb and the lower annular edge of the former, respectively.

An inner movable cylindrical valve member 28 has an axial charging bore 29 which extends axially from the upper end thereof and is closed at the lower end, charging side holes 31 which extend from the lower end of the axial bore 29 to the valve ports formed on the outer circumference thereof, a protruding taper valve member portion 32 which protrudes from the upper end thereof for guiding the valved charging pipe P, an annular protrusion 33 which has an arcuate section and which protrudes radially outwardly from the outer circumference thereof while merging into the root of the taper portion 32 thereof, and a transverse groove 34 which is formed at the lowermost end thereof for either receiving the edge of a tool or bearing later-described bias means attached. The maximum diameter of the annular protrusion 33 is made substantially equal to the diameter of the axial through hole 24. Incidentally, numeral 35, as shown in broken line, indicates an optional annular groove which is formed coaxially as a modification of the valve port in the outer circumference of the valve member 28.

The elastic flexible cover tube used in this second embodiment is substantially similar to that shown in FIG. 1 and is indicated at 13'. The slight difference resides in that the cover tube 13' is formed with only one turned annular lip 13'a. More specifically, the cover tube 13' has its upper end fitted to cover the outer circumference of the annular protrusion 33 up to the root of the taper valve member portion 32 and to depend along the outer circumference of the remaining valve member 28 while covering and sealing the valve ports at the leading ends of the side holes 31. The cover tube 13' has its lower end coaxially turned up so that the annular lip 13'a is mounted on the lower end of the cylinder portion 22 thereby to snugly fit the annular protrusion 26 thereon. Although the fitting and sealing method thus far described is effected by the elasticity of the cover tube 13' itself, it can be performed by suitable auxiliary means.

In the second embodiment shown, moreover, the inner movable valve member 28 is biased upward by the elastic property and the turned annular lip 13'a of the cover tube 13', and the pressure in the tank chamber C is usually higher than the ambient pressure. If, therefore, the valve member 28 is made of a light material such as plastics, there can be obtained another advantage that no special biasing means has to be added. This advantage is obtainable in the third embodiment of the present invention, too, which will be described with reference to FIG. 4. In order to ensure the biasing action, however, suitable bias means may be provided including a wound elastic annular band 36 and an elastic flexible band 37, as shown in FIG. 3.

In addition to the advantages common to the first embodiment shown in FIG. 1, the charging valve 20 thus constructed can enjoy another advantage that the number of the parts needed and the number of the steps for production can be reduced in comparison with the existing charging valves. Moreover, it is quite apparent to those skilled in the art that the charging operations can be effected remarkably simply and promptly merely by forcing the charging pipe into the charging valve while markedly facilitating conversion of the valve into that of the so-called "discharge preceding type". As such being the case, the detailed description of the operations and resultant effects of the valve is omitted here.

It should be noted, however, that the inner movable valve member can prevent leakage and damage of the charging valve in automatic response to the eccentricity and axial inclination of the charging pipe, which is liable to take place during the actual operations of the valve. Incidentally, another advantage of the function as a safety valve can be obtained if the discharge hole 27 is omitted, but this omission is not desirable in the point of the charging efficiency.

Reference is further turned to FIG. 4 showing a third embodiment of the present invention, in which the valve mechanism 10 of the first embodiment is applied to an injecting and charging valve of the direct connection type for a gas lighter. This application results in the addition of the aforementioned several features and advantages of the present invention to the injecting and charging valve.

A fastened outer cylinder 41 is mounted to depend from the tank head wall W into the tank chamber C and is composed of an upper cylinder portion 42, a lower cylinder portion 43 which is coaxially screwed on the lower end of the upper cylinder portion 42, and an inner cylinder 44 which is also coaxially screwed downwardly into the upper cylinder portion 42.

The inner cylinder 44 is formed with an axial through hole 45 and an annular protrusion 46 which coaxially protrudes radially outwardly from the lower end wall of the through hole 45 so as to fit thereon the turned annular lip 47a of an upper flexible cover tube 47. On the other hand, the upper cylinder portion 42 has formed, at a location axially spaced from the end thereof, on the inside an inner annular shoulder 48, which is made coactive with the annular protrusion 46 thereby to fit the annular lip 47a of the upper flexible cover tube 47, and at its lower end with a coaxial inner annular shoulder which defines a conical valve seat 49 made coactive with the outer annular circumference of the inside upper fitted portion of a lower flexible cover tube 51 thereby to provide a discharge and injection valve portion. The aforementioned inner annular shoulder has its upper side defining the lower limit of a cylindrical recess 52. On the other hand, moreover, the lower cylinder portion 43 is formed at its screwed portion on the upper cylinder portion 42 with a notched longitudinal hole 53 which communicates a cylindrical recess 54 and the tank chamber C thereby to provide a discharge and injection passage. There is further formed at the lower end of the lower coaxial constriction of the lower cylinder portion 43 an annular protrusion 55 which protrudes radially outwardly to fit thereon the turned annular lips 51a of the lower cover tube 51. Still further formed on the upper side of the aforementioned lower constriction of the lower cylinder portion 43 is an inner annular shoulder 56 which provides a seat for the lower end of such a later-described compression spring 57 as is accommodated in the cylindrical recess 54.

A cylindrical nozzle member 58 acting as an injecting and charging nozzle is fitted in the aforementioned outer cylinder 41 in a manner to be moved up and down. The nozzle member 58 thus fitted is formed on the outer circumference of the upwardly protruding cylindrical portion thereof with a longitudinal notch 59 which defines an injecting upward shoulder 61. Further formed at an upper portion of the outer circumference corresponding to the fitted portion of the nozzle member 58 is an upper annular protrusion 62 which protrudes radially outwardly to snugly fit the upper inner wall of the upper cover tube 47. Further formed on the outer circumference of the lower end of the nozzle member 58 is a lower annular protrusion 63 which has a generally arcuate section so as to similarly fit the inner wall of the upper end of the lower cover tube 51. Further formed in the nozzle member 58 is a nozzle exit 64 which is located at the top thereof. Further formed in the nozzle member 58 is an axial through bore 65 which coaxially extends downwardly therethrough while being expanded from the nozzle exit 64. Further formed in the nozzle member 58 above the aforementioned lower annular protrusion 63 is a side hole 66 which always provides communication between the cylindrical recess 52 and a lower expanded wall 67 of the axial bore 65. There is mounted in the nozzle member 58 an elastic tubular member 68 which is fitted in the lower expanded wall 67 while covering the inner end of the side hole 66 and which has substantially the same internal diameter as the diameter of the axial bore 65 so that it is made to shut off the side hole 66 by the charging pressure in the axial bore 65. Further formed around the outer circumference of the nozzle member 58 above the side hole 66 is an axial groove 69 which always has communication with the atmosphere through the upper annular protrusion 62 while being defined by the inner wall of the upper cover tube 47 but which is blocked from communication with the aforementioned recess 52 by cooperation with the upper cover tube 47 so long as the forced insertion of the nozzle member 58 does not exceed its beginning maximum stroke, as indicated at B. The axial groove 69 thus formed and the aforementioned upper cover tube 47 coact to provide a valve mechanism, which will be referred to as a stroke valve mechanism 71.

On the other hand, a charging valve mechanism 72 is equipped with an inner movable valve member 73 which is coaxially connected in a sealed manner to the lower end of the cylindrical nozzle member 58 and which is coaxially formed with both an outer circumference having substantially the same diameter as that of the outer circumference of the nozzle member 58 and a charging axial bore 74 being closed at its lower end and having substantially the same diameter as that of the axial bore 65 while having communication therewith. The charging valve mechanism 72 thus equipped is formed with a threaded portion 75 which is screwed at the upper end portion of the valve member 73 on the lower end in the expanded wall 67 of the axial bore 65 and which has its upper end face constricted from the outer circumference thereof so as to loosely bear the lower end face of the elastic tubular member 68 for the aforementioned check valve. Further formed in the vicinity of the lower end of the aforementioned valve member 73 is a charging side hole 76 which provides communication between the lower end of the aforementioned axial bore 74 and the not-numbered valve port formed in the outer circumference of the valve member 73. The charging valve mechanism 72 thus formed is further equipped with the aforementioned lower flexible cover tube 51 which has its upper inner end fitted on the aforementioned lower annular protrusion at the lower end of the nozzle member 58, which depends along the valve member 73 while sealing the outer circumference of the same member 73, and which covers the aforementioned valve port during the time period other than the charging time so that it is always rolled up radially outwardly to form the turned annular lip 51a where it is fitted on the aforementioned constriction at the lower end of the lower cylinder portion 43, i.e., at the annular protrusion 55 of the same. Incidentally, numeral 77 indicates a transverse groove which is formed at the lower end of the valve member 73 so that it may either receive an assembling tool or bearing suitable bias means to be added, if necessary. On the other hand, numeral 57 indicates the aforementioned compression spring which is operative to bias the valve member 73 and the nozzle member 58 upward and which has its upper end borne on the lower bearing half of the lower annular protrusion 63 of the lower cover tube 51. Although not shown, the compression spring 57 can be replaced as a modification by suitable bias means such as that exemplified in FIGS. 2 and 3 or a leaf spring which is interposed between the upward protruding cylindrical portion of the nozzle member 58 and a suitable external stationary portion while offering no obstruction to the operations of an actuating mechanism 80 and the charging injection port I of a gas supply bomb. Both of these are shown in broken lines and will be described later in detail.

However, the aforementioned bias means is not indispensable, as has been described with reference to FIGS. 2 and 3 but is employed to improve the function of the injecting and charging valve 40 in accordance with the designing conditions required.

The operations of the injecting, and charging valve 40 will be described in the following, but this description is tried to be simplified as much as possible by omitting the repeated one.

The actuating mechanism 80 for effecting and adjusting the injection, which has been touched in the above, is indicated in broken lines as a whole and is equipped with an actuating lever 81. This actuating lever 81 is formed at one end with a movable fulcrum 82, which can have its position adjusted to move up and down, and at a preset spacing from the fulcrum 82 toward the other end with a downward semicircular tongue 83 which is in abutment engagement with the upward shoulder 61 of the nozzle member 58. It is as desirable as possible that the actuating lever 81 and the semicircular tongue 83 are so bifurcated in the vicinity of the nozzle member 58 as to clamp the same inbetween. In this modification, it is quite natural that the longitudinal notch 59 and the upward shoulder 61 are provided axially symmetrically in two sets. When the other end of the actuating lever 81, which is located at the right-hand side of FIG. 4, is depressed by means of a not-shown ignition cooperating mechanism, the head portion of the aforementioned semicircular tongue 83 depresses the aforementioned nozzle member 58 to an extent within the beginning maximum stroke B through the aforementioned upward shoulder 61 thereby to open the discharge and injection valve portion which is composed of the valve seat 49 and the lower annular protrusion 63. As a result, the injection passage, which is composed of the tank chamber C, the longitudinal notch 53, cylindrical recess 54, the cylindrical recess 52, the side hole 66, the tubular member 68, the axial bore 65 and the nozzle exit 64, is fully opened to effect the injection from the nozzle exit 64. The injecting rate at this time is determined both by the arm ratio of of the aforementioned lever 81, which is suitably selected in advance, and by the not-shown timely fine adjustment of the aforementioned movable fulcrum 92. Meanwhile, moreover, the respective passages for the discharging and charging operations are kept under the blocked conditions by the upper and lower cover tubes 47 and 51, respectively.

For the charging operation, if the valved charging injection port I of the gas supply bomb, which is different from the charging pipe P of FIG. 2 in that it is provided with means for sealing the nozzle exit 64, is forced into contact the nozzle exit 64 so that it may depress this exit 64, while being held in sealed communication therewith, to an extent within such a full stroke A as exceeds the aforementioned beginning maximum stroke B, then the respective turned annular lips 47a and 51a of the upper and lower cover tubes 47 and 51 are rolled up to open the respective passages, which have been shut off until that time, i.e., the whole discharge passage, which is composed of the tank chamber C, the longitudinal hole 53, the cylindrical recess 54, the cylindrical recess 52, the axial groove 69 and the ambient atmosphere (Here, the side hole 66 is shut off with the elastic tubular member 68 by the charging pressure acting upon the latter), and the whole charging passage, which is composed of the injection port I, the nozzle exit 64, the axial bore 65, the inside hole of the tubular member 68, the axial bore 74, the side hole 76 and the tank chamber C, in a manner to be isolated from each other, thus accomplishing the discharging and charging operations. In this instance, moreover, by suitably selecting in advance the timing relationships of the respective cover tubes 47 and 51 with their coactive portions which are composed of the axial groove 69 and the valve port of the side hole 76, it is quite natural that the timing relationships between the discharging and charging operations can be made to take any mode, i.e., the simultaneous mode, the discharge preceding mode or the charge preceding mode. By suitably selecting the dimensions of the respective parts, moreover, it is also quite natural that the relationship in the fluid flow rate can be made a desirable one.

On the other hand, the ending operations of the injection and charge thus far described can be accomplished merely by releasing the nozzle member 58 with the use of either the actuating lever 81 or the injection port I. By this release, the restoration based upon the upward bias of the nozzle member 58 is exerted to allow the respective parts to restore their initial conditions. Thus, the communication between the tank chamber C and the atmosphere is completely blocked until the next injecting or charging operation which can be selected at will.

The advantages obtainable by the injecting and charging valve 40 having the constructions thus far described will be itemized in the following:

(1) Since the injecting and charging valve 40 is of the discharge preceding direct type for the charging operation, the valve charging injection port of a gas supply bomb is used to depress the nozzle port of the liftable nozzle member, while being in direct sealing contact therewith, until the depression ending stroke, the stroke valve mechanism is opened to vent the discharge passage to the atmosphere but the check valve mechanism is closed to isolate the discharge passage from the charge passage thereby to effect direct communication from the nozzle exit to the charging valve, such a complicated charging operation, by which the cover of a separated charging port has to be removed for each charging operation, as has been experienced in the prior art can be dispensed with to remarkably simplify the charging operation and to improve the charging efficiency.

(2) Since the valve 40 is so constructed that, in the beginning depression stroke of the nozzle member, the stroke valve is under its closed condition not to vent the discharge passage directly to the atmosphere but the check valve mechanism is opened to effect the communication between the discharge passage and the nozzle exit, i.e., to establish the curved injection passage, dangerous abnormal phenomena such as the injection of liquid droplets or a pulsating abrupt injection, which has been experienced in the prior art using the conventional charge passage, can be prevented without sacrificing the charging efficiency.

(3) Since the valve 40 is so constructed that, in the beginning depression stroke, the opening of the discharge valve is varied in accordance with the degree of depression to adjust the injection rate, separate adjusting mechanism according to the prior art can be dispensed with thereby reducing the chances of gas leakage and simplifying the gas injection adjustment.

(4) Since the valve 40 is so constructed that its injecting and charging operations are accomplished merely by the use of a single nozzle member which is received in the single outer cylinder, the number of the production steps and the cost for the materials can be reduced.

The foregoing description has been made mainly in connection with the embodiments shown, and as such being the case the present invention should not be limited thereto but can be modified in various manners within the scope of the appended claims.

Prior to defining the present invention with the Claims, the major advantages and resultant effects shared among the embodiments thus far described will be summarized and itemized in the following:

(1) It is sufficient that the actuating operations can be performed merely by reciprocating or depressing actions while causing no trouble even if the actuating direction becomes more or less eccentric so that the actuating operations can be remarkably simplified without requiring for no special care.

(2) The opening and closing modes of the valves are effected by the rolling motions into and out of engagement so that at least the wear and leakage due to the sliding motions or the prese-fit can be prevented.

(3) Expansion about the axis and accordingly the diameter of the valves according to the present invention can be reduced.

(4) It is possible to simplify the construction, to loosen the requirement for the machining precision of parts, to make unnecessary the rigidity as high as metal, and to apply the machining process for mass-production.

What is claimed is:

1. A valve mechanism comprising: a cylindrical inner movable valve member having at least one valve port and at least one axial fluid passage communicating said valve port with an outer space; a fastened outer cylinder formed on at least one end thereof with a cylinder portion fitted coaxially and loosely fitted on the outer circumference of said inner movable valve member; and a rolling seal-type elastic flexible cover tube having a smaller thickness than the loosely fitting spacing between said inner movable valve member and said outer cylinder and having a portion fitted fluid-tight on said inner movable valve member, said flexible cover tube having a turned annular lip and being fitted on the cylinder portion, whereby the turned annular lip of said flexible cover tube is rolled along the outer circumference of said valve member, while sealing the same, thereby to open and close the valve port of said valve member.

2. A valve mechanism according to claim 1, wherein said valve is movable in its axial direction relative to said outer cylinder, wherein the fluid passage of said valve member is closed at one end and includes a second valve port communicating said passage with a second outer space and wherein the turned annular lip of said cover tube has its inner and outer sides partially fitted coaxially in different diameters on both said outer cylinder and said valve member.

3. A valve mechanism according to claim 1, further comprising bias means for biasing said valve member to a desired relative position to said outer cylinder.

4. A valve mechanism according to claim 1, wherein the valve port of said valve member includes an annular groove formed coaxially on the outer circumference of said valve member.

5. A gas lighter charging valve for charging liquified gases when the valved charging pipe of a gas supply bomb is forced thereinto, comprising: a fastened outer cylinder mounted to depend into the chamber of the tank of a gas lighter from the head wall of the tank; an inner movable valve member having a generally cylindrical shape fitted coaxially in said outer cylinder in a manner to move up and down and formed at its lower outer circumference with a valve port and at its inside with a charging passage extending from the center of the upper side thereof to said valve port; and a rolling seal-type elastic flexible cover tube depending along the outer circumference of said valve member, while being fitted fluid-tight on said outer circumference, in a manner to cover and seal the valve port of said valve member during the time other than the charging operation, said cover tube having its lower portion coaxially turned upward to the outside to provide a turned annular lip, where it is fitted at its outer upper end on the lower end of said outer cylinder, said cover tube being made to have such an elasticity as can mainly perform the upward biasing operation of said valve member.

6. A gas lighter charging valve according to claim 5, wherein said outer cylinder has its cylinder portion formed at its axially center portion with a downward conical valve seat made coaxial and with a discharge passage providing communication between the space below said valve seat and the tank chamber of said gas lighter, wherein said valve member is formed at its upper outer circumference with an annular protrusion protruding radially outwardly to have a generally arcuate section, and wherein said cover tube has its inner upper end fitted on the annular protrusion of said valve member and formed with an upward upper surface which is made coactive with said valve seat to provide a discharge valve portion, said cover tube being mounted to depend, while sealing the outer circumference of said valve member, until it coacts with the valve port of said valve member to provide a charging valve portion.

7. A gas lighter charging valve according to claim 6, wherein said cover tube and said valve port are so sized and positioned relative to each other that the valve opening timing of said discharge valve portion is made to precede that of said charging valve portion.

8. A gas lighter charging valve according to claim 6, further comprising a protruding taper valve member portion extending upward from the upper side of said valve member, while being commonly formed with said charging passage, thereby to guide the valved charging pipe of said gas supply bomb, the upper fitted portion of said cover tube being made to extend to a position in the vicinity of the root of said taper valve member portion.

9. A gas lighter charging valve according to claim 5, further comprising bias means for increasing the upward bias of said valve member.

10. A gas lighter charging valve according to claim 9, wherein said bias means includes a wound elastic annular band fitted elastically on the annular recess, which is formed in the outer circumference of said outer cylinder, and an elastic flexible band made to extend in the transverse groove at the lower end of said valve member while having its both ends retained at said annular band.

11. A gas lighter charging valve according to claim 5, wherein the valve port of said valve member includes an annular groove formed coaxially on the outer circumference of said valve member.

12. An injecting and charging valve of the direct connection type for a gas lighter, in which the charging operation is performed simultaneously with the discharging operation by the valved charging injection port of a gas supply bomb which is brought into contact to depress the nozzle exit of said injecting and charging valve, and in which the injection is effected and adjusted in accordance with the partially depressed extent of said nozzle exit by the action of an actuating mechanism which is generally responsive to the igniting operation of the gas lighter, comprising: a fastened outer cylinder mounted to depend into the chamber of the tank of said gas lighter from the head wall of the tank; two rolling seal-type elastic flexible cover tubes; a cylindrical nozzle member received substantially coaxially in said outer cylinder in a manner to move up and down and biased upward mainly by the elasticities of said cover tubes thereby to act as an injecting and charging cylinder, said nozzle member being formed with a side hole at its lower side wall and with an axial through hole extending from the nozzle exit thereof; an elastic tubular member providing a check valve mechanism made coactive with the side wall of said nozzle member thereby to allow only the injection into said axial through hole; a stroke valve mechanism including one of said cover tubes and adapted to be released to the atmosphere only during the charging operation corresponding to the ending depression stroke of said nozzle member thereby to shut off the tubular gap between said outer cylinder and the outer circumference of said nozzle member above said side wall of the same; and a discharge preceding type charging valve mechanism including the other of said cover tubes and connected to the lower end of said nozzle member in a coaxially communicating manner, whereby the injection can be effected and adjusted in accordance with the depressed extent of said nozzle member during the beginning depression stroke substantially corresponding to the discharge preceding section of said charging valve mechanism, and wherein the discharging and charging operations can be effected selectively at any time in accordance with the ending depression stroke of said nozzle member by said gas supply bomb.

13. An injecting and charging valve of direct connection type for a gas lighter, comprising: a fastened outer cylinder including at least upper and lower cylinder portions mounted removably to each other and formed in between with a discharge passage having communication with the chamber of the tank of said gas lighter; a cylindrical nozzle member having its substantially lower half received in said outer cylinder, while being additionally biased upward by the action of biasing means, and its substantially upper half protruding upward from said outer cylinder and formed with an injection shoulder to be brought into contact with an actuating mechanism for effecting and adjusting the injection; an elastic tubular member coaxially fitted in the lower expanded wall of the axial through bore, which is expanded from the nozzle exit at the head of said nozzle member and made to coaxially extend downward therefrom in a communicating manner, thereby to provide a check valve mechanism for automatically interchanging the injecting and charging operations; an inner movable valve member of cylindrical shape loosely bearing the lower edge of said tubular member and connected to said nozzle member coaxially in a sealing manner; and a pair of rolling seal-type elastic flexible cover tubes having their respective inner and outer end sides fitted, respectively, between said outer cylinder and the upper and lower outer circumferences above and below the injection side wall, which is formed in the lower wall of said nozzle member while extending in the direction toward said check valve mechanism, thereby to provide a discharging stroke valve mechanism and an injecting, discharging and charging valve mechanism, respectively, whereby the injection from said nozzle exit is effected and adjusted in accordance with the beginning depression stroke in which said nozzle member is depressed through the injection shoulder thereof by the action of said actuating mechanism, and wherein the charging operation is effected simultaneously with the discharging operation by the depression of the valved charging injection port of said gas supply bomb, which is connected directly to said nozzle exit in a fluid-tight communicating manner during the charging operation, until the ending depression stroke exceeding said beginning depression stroke but included in the full stroke composed of the beginning and ending depression strokes.

14. An injecting and charging valve according to claim 13, wherein said nozzle member is formed at the outer circumference of the lower end thereof with an annular protrusion protruding radially outwardly and coaxially therefrom to have a generally arcuate section thereby to fit thereon the inner fitted side at the upper end of the upper one of said cover tubes, which is included in said discharge preceding type charging valve mechanism, wherein the upper side surface of said annular protrusion provides a discharging and injecting valve portion which is made coactive through the wall of said cover tube with a conical valve seat at the lower end of the upper one of said cylinder portions thereby to establish and adjust communication between said discharge passage and a recess defined between said nozzle member and said upper cylinder portion, wherein said lower cylinder portion is formed at its constricted lower end with a radially protruding annular protrusion which fits thereon said lower cover tube at its outwardly turned annular lip, wherein said nozzle member is formed on its outer circumference with an axial groove which extends along the axis thereof through the annual protrusion thereof for fitting the inner upper end of said upper cover tube thereby to provide such a valve port as is included in said stroke valve mechanism and as is coactive with said upper cover tube, wherein said outer cylinder includes an inner cylinder formed with an axial through hole and with an annular protrusion extending outwardly from the outer wall of the lower end of said axial through hole to provide a fitting portion for fitting thereon the turned annular lip of said upper cover tube, and wherein said upper cylinder portion is coaxially formed with an inner annular shoulder which is made coactive with the annular protrusion of said inner cylinder to improve the fitting effect and to provide sealing means for sealing said inner and outer cylinders.

15. An injecting and charging valve according to claim 13, wherein said biasing means includes a compression spring mounted in said outer cylinder.

16. An injecting and charging valve according to claim 13, wherein said biasing means includes a leaf spring interposed between said nozzle member and an outside member.

17. An injecting and charging valve according to claim 13, wherein said valve member is formed with a valve port having communication with the axial bore thereof and including an annular groove formed coaxially on the outer circumference thereof.

* * * * *